United States Patent
Hashiguchi

(10) Patent No.: US 12,451,634 B2
(45) Date of Patent: Oct. 21, 2025

(54) CONNECTOR

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 334 days.

(21) Appl. No.: 18/218,936

(22) Filed: Jul. 6, 2023

(65) Prior Publication Data
US 2024/0063565 A1    Feb. 22, 2024

(30) Foreign Application Priority Data

Aug. 16, 2022  (JP) .................................. 2022-129695

(51) Int. Cl.
*H01R 12/79* (2011.01)
*H01R 13/24* (2006.01)
*H01R 13/629* (2006.01)

(52) U.S. Cl.
CPC ......... *H01R 12/79* (2013.01); *H01R 13/2407* (2013.01); *H01R 13/629* (2013.01)

(58) Field of Classification Search
CPC .............................. H01R 13/629; G06K 7/003
See application file for complete search history.

(56) References Cited

U.S. PATENT DOCUMENTS

| | | | | |
|---|---|---|---|---|
| 5,012,078 A | * | 4/1991 | Pernet .................. | G06K 7/0069 235/483 |
| 5,066,241 A | * | 11/1991 | Hills .................. | G06K 13/0806 439/635 |
| 5,902,992 A | * | 5/1999 | Igarashi ............... | G06K 7/0021 235/492 |
| 5,969,330 A | * | 10/1999 | Korsunsky ........... | G06K 7/0021 235/441 |
| 5,997,356 A | * | 12/1999 | Chang .................. | G06K 7/0021 235/441 |
| 6,015,311 A | * | 1/2000 | Benjamin .............. | G06K 7/003 439/267 |
| 6,062,889 A | * | 5/2000 | Hyland .................. | H01R 12/83 200/51.12 |

(Continued)

FOREIGN PATENT DOCUMENTS

JP    3021370 B2    3/2000

*Primary Examiner* — Neil Abrams
(74) *Attorney, Agent, or Firm* — Greenblum & Bernstein, P.L.C.

(57) ABSTRACT

A connector electrically connecting a module substrate and a main substrate includes: a housing mounted on the main substrate; contacts held on the housing, the contacts including contact parts and connection parts connected to the main substrate; a frame including a flat board part and side board parts, the flat board part fixed to the main substrate, one of a cam groove and a projection formed on the side board parts; a slider attached between the side board parts during the projection's insertion into the cam groove, the other of the cam groove and the projection formed at opposite side portions; a plate contained between the side board parts, the plate forming an insertion space between the plate and the housing, where when the slider slides in the module substrate's insertion direction into the insertion space, the slider presses the module substrate against the contact parts through the plate.

6 Claims, 12 Drawing Sheets

(56) References Cited

U.S. PATENT DOCUMENTS

| | | | | |
|---|---|---|---|---|
| 6,126,466 A | * | 10/2000 | Inadama | G06K 7/003 |
| | | | | 439/260 |
| 6,421,245 B1 | * | 7/2002 | Kashima | G06K 13/08 |
| | | | | 361/801 |
| 9,147,094 B2 | * | 9/2015 | Bertsch | G06K 7/0069 |
| 2024/0063565 A1 | * | 2/2024 | Hashiguchi | G06K 7/0021 |

* cited by examiner

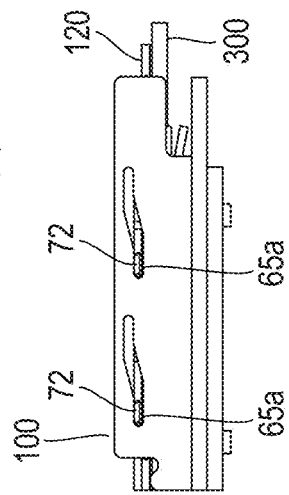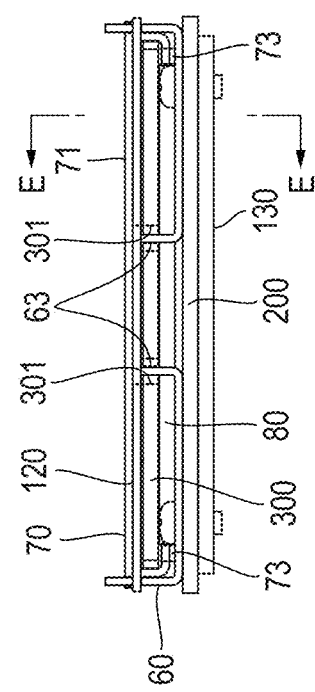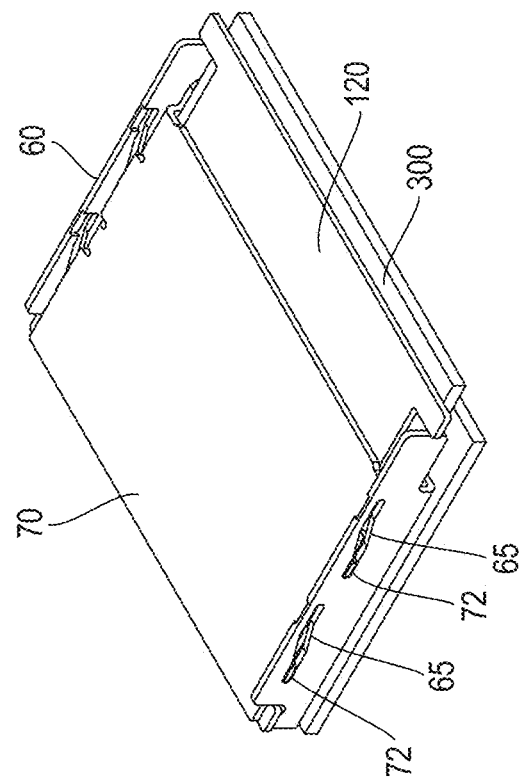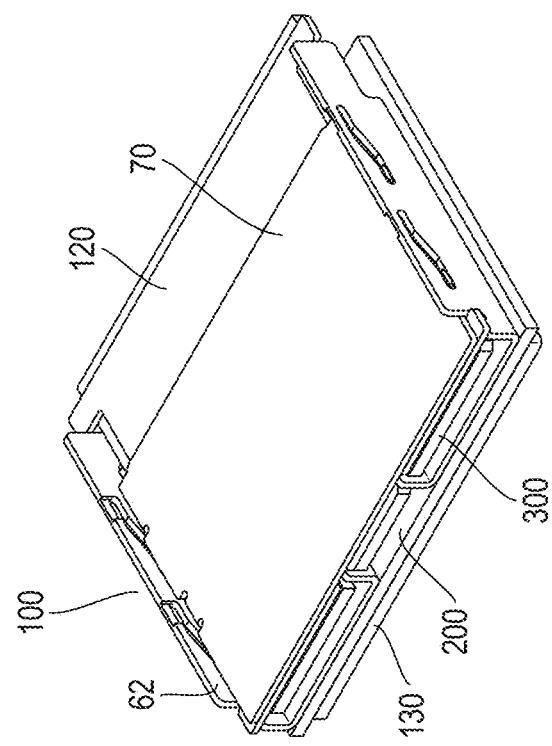

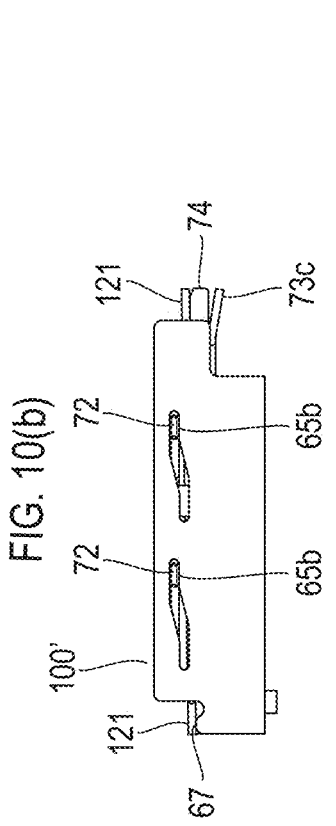
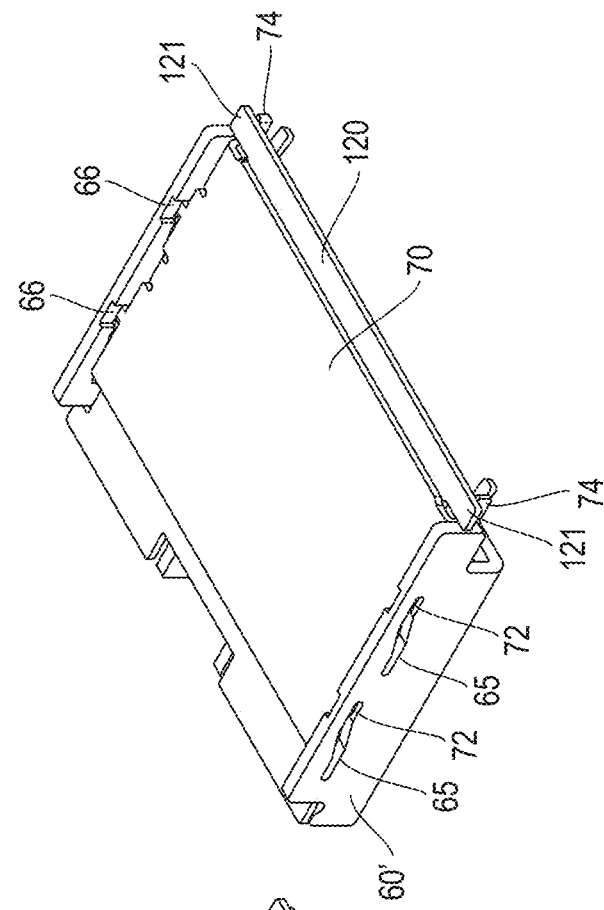
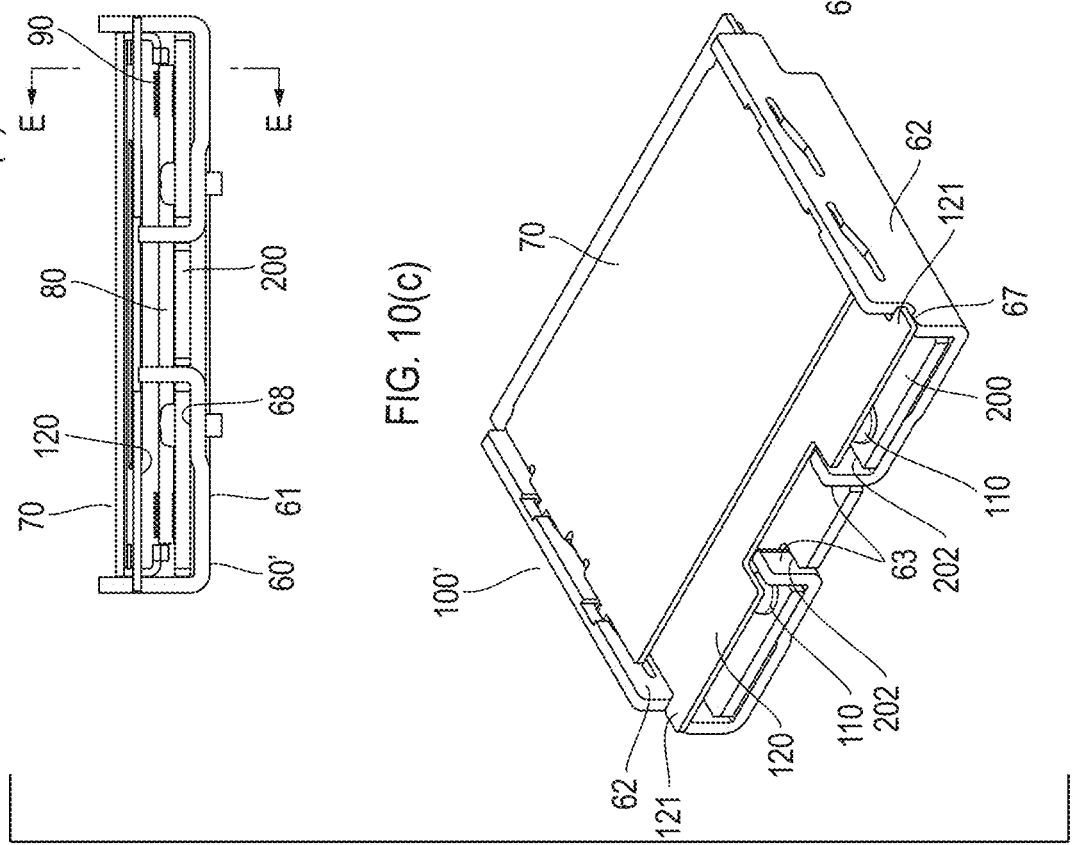

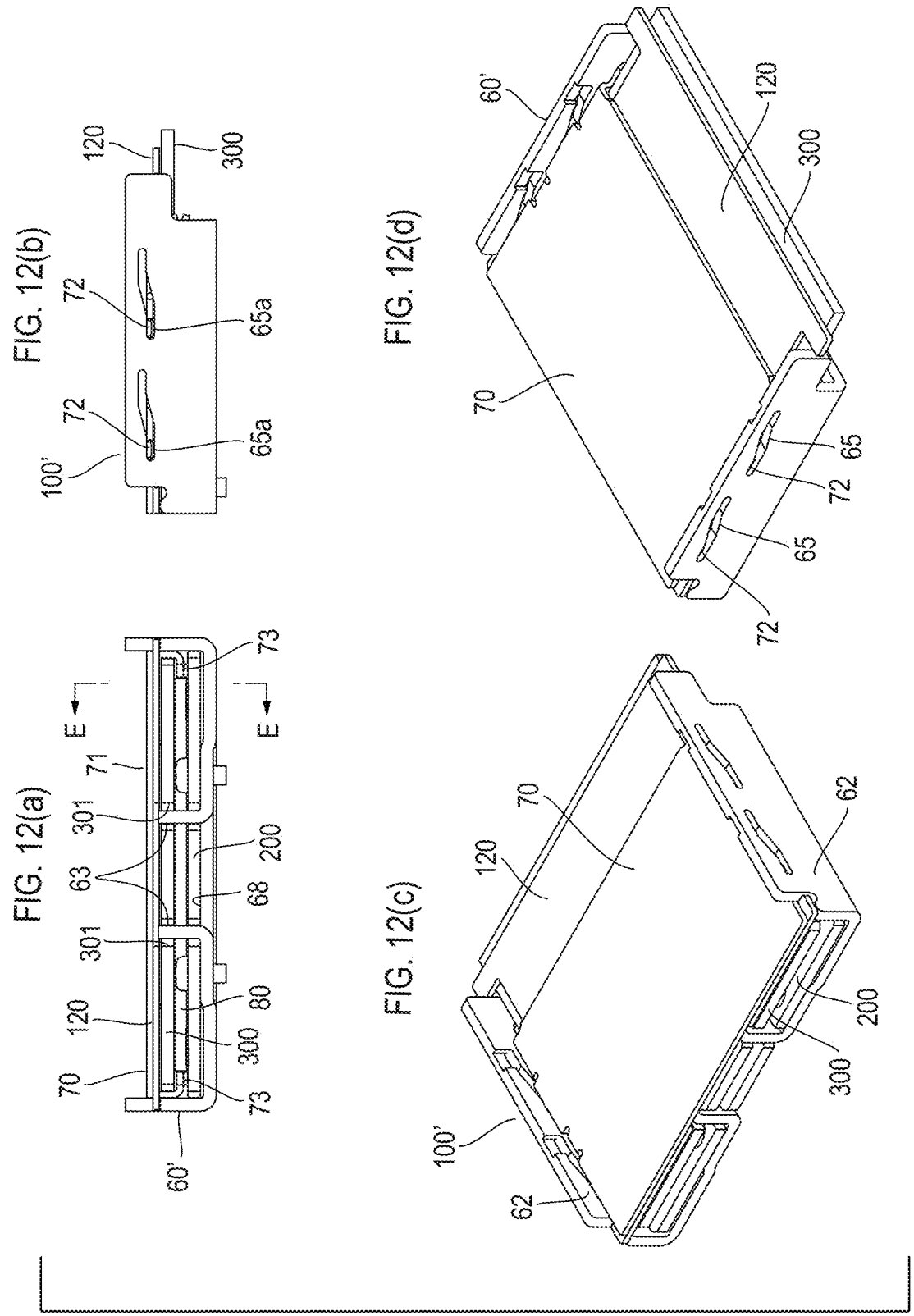

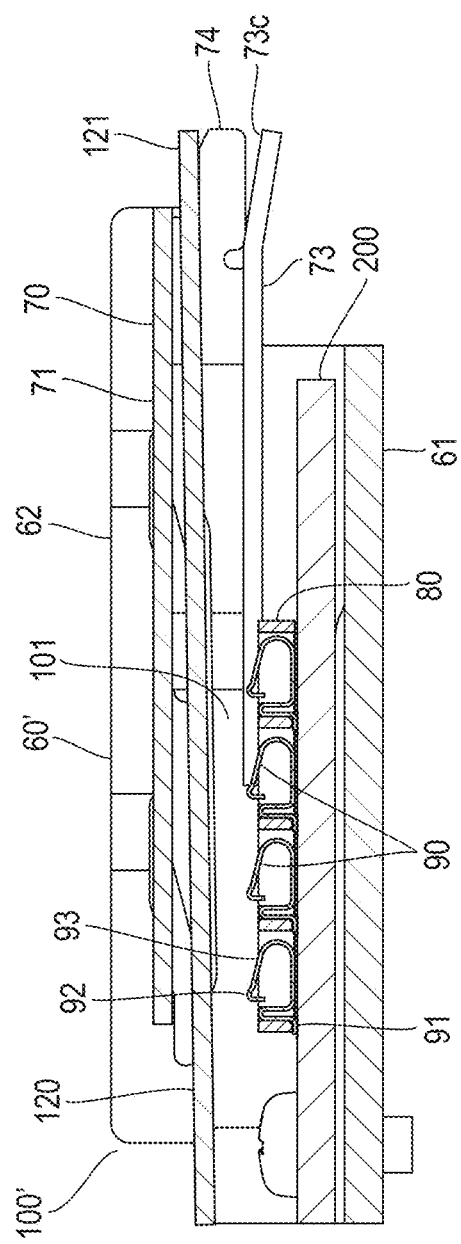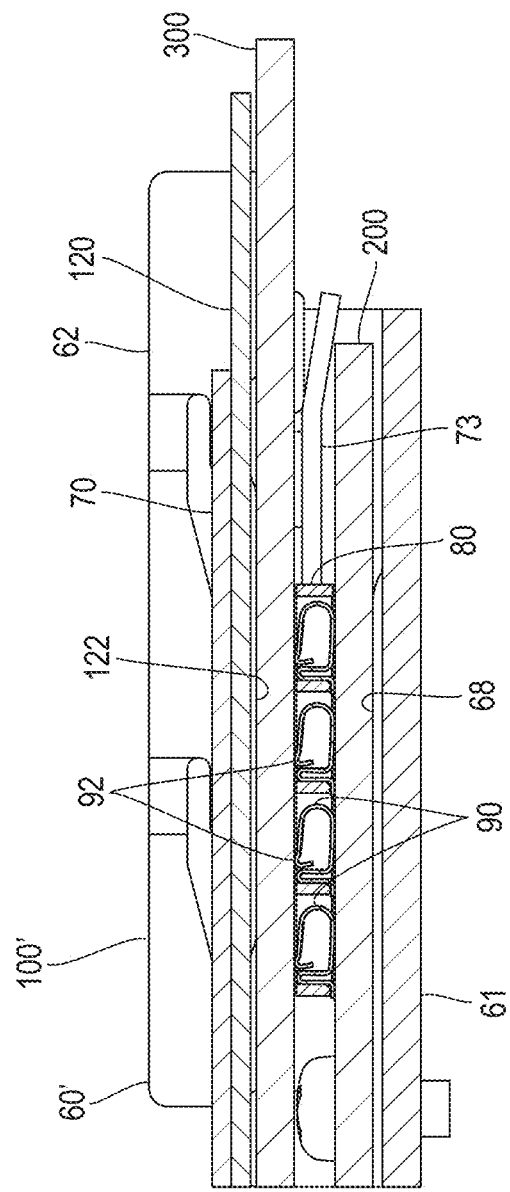
FIG. 13(a)
FIG. 13(b)

CONNECTOR

TECHNICAL FIELD

The invention relates to a connector that electrically connects a substrate and a substrate.

BACKGROUND ART

FIGS. 1 to 3 show the configuration and operation of a card connector described in Japanese Registered Patent No. 3021370 (referred to as "Patent Literature 1" hereinafter), as a conventional example of the connector. The card connector includes a cover insulator 10, a base insulator 20, contacts 30, and an eject mechanism 40.

As shown in FIG. 3, the contact 30 is constituted by a fixation part 30a that is fixed to a lower surface part 21 of the base insulator 20, a contact point part 30b that can be brought into contact with a land 51 of an IC card 50, a spring part 30c that biases the contact point part 30b upward, and a terminal part 30d that is connected to an unillustrated printed substrate.

The cover insulator 10 includes a card support surface 11 that supports an upper surface 50a of the IC card 50, side surface parts 12 that support both side surfaces of the IC card 50, an abutment part 13 against which an insertion-directional distal end part 52 of the IC card 50 abuts, a support part 14 that supports both side edges of a lower surface 50b of the IC card 50, and a guide surface 15 that guides the IC card 50 to the abutment part 13. The card support surface 11 is positioned above the contact point parts 30b of the contacts 30, and faces a lower surface part 21 of the base insulator 20. On each side surface part 12, columnar projection parts 16, 17 are provided.

An opening 23 is formed on an upper surface part 22 of the base insulator 20, and cam grooves 25, 26 are formed on both side surface portions 24. The cam groove 25 is positioned on a rear side in a card insertion direction D, and the cam groove 26 is positioned on a front side in the card insertion direction D. The longitudinal direction of the cam groove 25 is parallel to the card insertion direction D, and the cam groove 25 guides the projection part 16. The longitudinal direction of the cam groove 26 is inclined with respect to the card insertion direction D, and the cam groove 26 guides the projection part 17 obliquely. Accordingly, the cover insulator 10 can move between a first position close to the contact point parts 30b of the contacts 30 and a second position far from the contact point parts 30b of the contacts 30.

In the card connector, before the IC card 50 is inserted, the projection parts 16, 17 of the cover insulator 10 are respectively positioned at a rear-side end part 25a of the cam groove 25 and a rear-side end part 26a of the cam groove 26 in the base insulator 20. When the IC card 50 is inserted into a card insertion slot 27 of the base insulator 20 in this state, both side edges of the lower surface 50b of the IC card 50 are supported by the support part 14 of the cover insulator 10, and the IC card 50 is guided to the abutment part 13 while being parallel to the card insertion direction D. The lower surface 50b of the IC card 50 is positioned above the contact point parts 30b of the contacts 30, and the IC card 50 does not contact with the contact point parts 30b of the contacts 30 (see FIG. 3(a)).

When the IC card 50 is inserted beyond a predetermined insertion amount (an insertion amount until the IC card 50 reaches the abutment part 13 of the cover insulator 10), the distal end part 52 of the IC card 50 abuts against the abutment part 13 of the cover insulator 10, and thereafter the projection part 17 of the cover insulator 10 is guided along the cam groove 26 obliquely downward, so that a card insertion-directional distal end side of the cover insulator 10 comes close to the lower surface part 21 of the base insulator 20. The upper surface 50a of the IC card 50 is pressed downward by the card support surface 11, and therefore the land 51 of the IC card 50 comes into contact with the contact point parts 30b of the contacts 30 (see FIGS. 2 and 3(b)). As a result, the IC card 50 and the printed substrate are electrically connected.

SUMMARY OF THE INVENTION

In the above-described card connector, when the IC card 50 is inserted, the distal end part 52 of the IC card 50 abuts against the abutment part 13 of the cover insulator 10. Thereafter, the cover insulator 10 is pressed by the IC card 50, and is moved from the second position to the first position while the projection parts 16, 17 are guided by the cam grooves 25, 26 of the base insulator 20. The distance in which the IC card 50 slides is a short distance in which the cover insulator 10 is moved from the second position up to the first position.

In Patent Literature 1, the distance in which the IC card 50 slides on the contacts 30 upon insertion of the IC card 50 is shortened in this way, and thereby the damage of the IC card 50 and the wear of the contact point parts 30b of the contacts 30 at the time of the insertion or removal of the IC card 50 are prevented.

However, in the configuration described in Patent Literature 1, it can be said that the prevention of the wear and the damage remains insufficient in that the insertion of the IC card 50 causes the state of the sliding between the IC card 50 and the contacts 30, and it can be said that there is room for improvement.

In view of this point, an object of the invention is to provide a connector that makes it possible to further prevent the wear of contacts and the wear of electrodes of a module substrate that come into contact with the contacts upon insertion or extraction of the module substrate, compared to the conventional example.

According to a mode for carrying out the invention, a connector for electrically connecting a module substrate and a main substrate, the module substrate comprising a plurality of electrodes arrayed lengthwise and breadthwise on one surface of the module substrate, comprises: a flattened housing being mounted on the main substrate; a plurality of contacts being arrayed and held on the flattened housing so as to correspond to the electrodes of the module substrate, the contacts comprising contact parts protruding from an opposing surface of a main substrate mount surface of the flattened housing and connection parts being connected to the electrodes of the main substrate; a frame comprising a flat board part fixed to a board surface of the main substrate, the pair of side board parts standing from the flat board part, one of a cam groove and a projection constituting a cam mechanism being formed on the pair of side board parts; a slider comprising a tabular shape, the other of the cam groove and the projection constituting the cam mechanism being formed at a pair of opposite side portions of the slider, the slider being attached between the pair of side board parts while the projection is inserted into the cam groove; and a plate comprising a tabular shape, the plate including protrusion parts at four corner parts, the two protrusion parts positioned forward being positioned on cutouts formed at front ends of the pair of side board parts, the two protrusion parts positioned rearward being positioned on support parts formed so as to protrude rearward at rear ends of the pair of opposite side portions of the slider and being contained between the pair of side board parts, the plate forming an insertion space for the module substrate between the plate and the flattened housing mounted on the main substrate, wherein the slider has a structure in which when the slider slides in the same direction as a direction of insertion of the module substrate into the insertion space, the slider shifts by the cam mechanism and presses the module substrate against the contact parts through the plate.

Effects of the Invention

According to the mode for carrying out the invention, it is possible to prevent the wear of contacts and the wear of electrodes of a module substrate that come into contact with the contacts upon insertion or extraction of the module substrate, compared to the conventional example, and consequently it is possible to obtain a long-life connector.

BRIEF DESCRIPTION OF THE DRAWINGS

FIG. 8(a) is an elevational view showing a state where the module substrate is inserted into the connector shown in FIG. 4, FIG. 8(b) is a side view of the state, FIG. 8(c) is a perspective view of the state as viewed from a forward side, and FIG. 8(d) is a perspective view of the state as viewed from a rearward side;

FIG. 10(a) is an elevational view showing a state where a second embodiment of the connector according to the mode for carrying out the invention is attached to the main substrate, FIG. 10(b) is a side view of the state, FIG. 10(c) is a perspective view of the state as viewed from a forward side, and FIG. 10(d) is a perspective view of the state as viewed from a rearward side;

FIG. 12(a) is an elevational view showing a state where the module substrate is inserted into the connector shown in FIG. 10, FIG. 12(b) is a side view of the state, FIG. 12(c) is a perspective view of the state as viewed from a forward side, and FIG. 12(d) is a perspective view of the state as viewed from a rearward side.

FIG. 13(a) is an E-E line enlarged sectional view of FIG. 10(a), and

FIG. 13(b) is an E-E line enlarged sectional view of FIG. 12(a).

DETAILED DESCRIPTION OF THE EMBODIMENTS

A mode for carrying out the invention will be described with embodiments with reference to the drawings.

First Embodiment

FIG. 4 shows the external appearance of a first embodiment of a connector according to a mode for carrying out the invention, and FIG. 4 shows a state where a connector 100 is attached to a main substrate 200. As for the main substrate 200, only a portion where the connector 100 is attached is illustrated, and the other portion is not illustrated.

Figure 1:
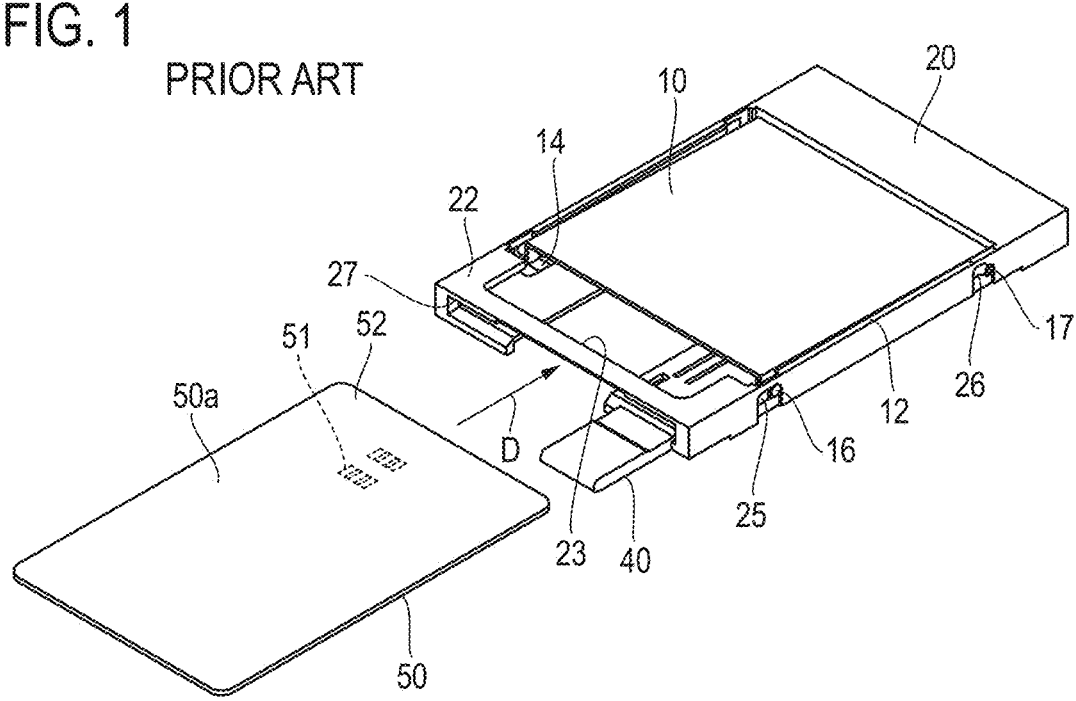
FIG. 1 is a perspective view showing a conventional card connector.
Figure 2:
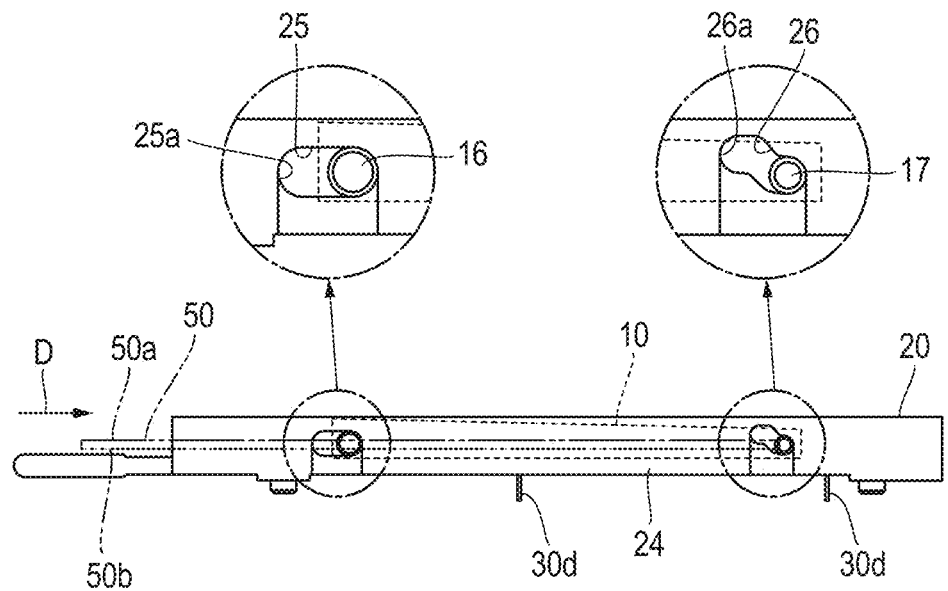
FIG. 2 is a side view of the card connector shown in FIG. 1.
Figure 3A:
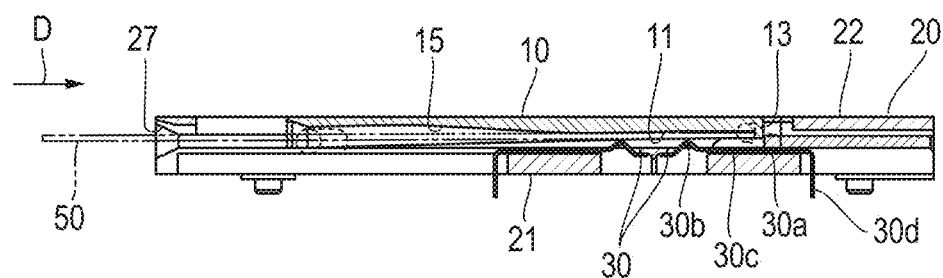
FIG. 3(a) is a longitudinal sectional view showing a state of the card connector shown in FIG. 1 before card insertion completion.
Figure 3B:
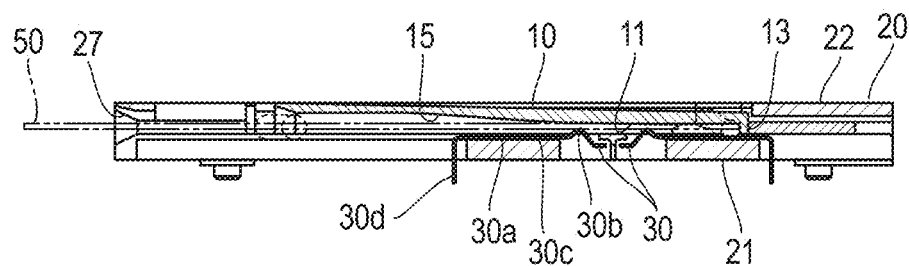
FIG. 3(b) is a longitudinal sectional view showing a state of the card connector shown in FIG. 1 at the time of card insertion completion.
Figure 4A:
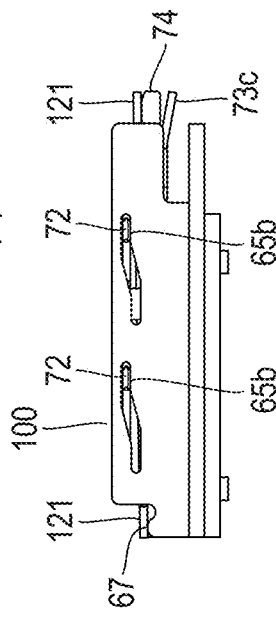
FIG. 4(a) is an elevational view showing a state where a first embodiment of a connector according to a mode for carrying out the invention is attached to a main substrate.
Figure 4B:
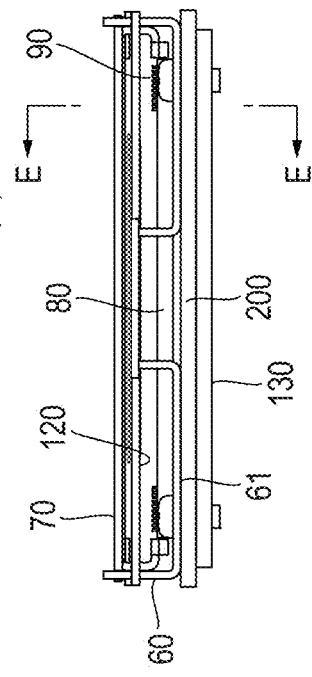
FIG. 4(b) is a side view of the state.
Figure 4C:
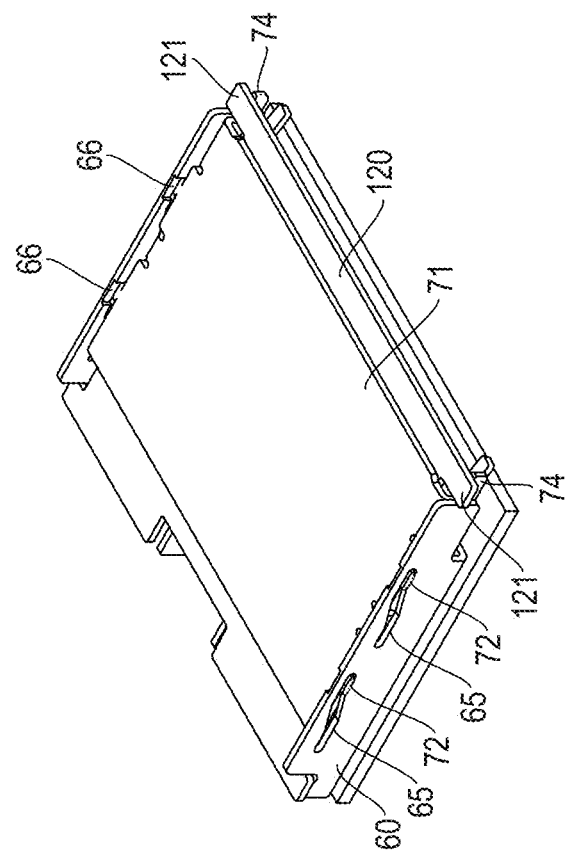
FIG. 4(c) is a perspective view of the state as viewed from a forward side.
Figure 4D:
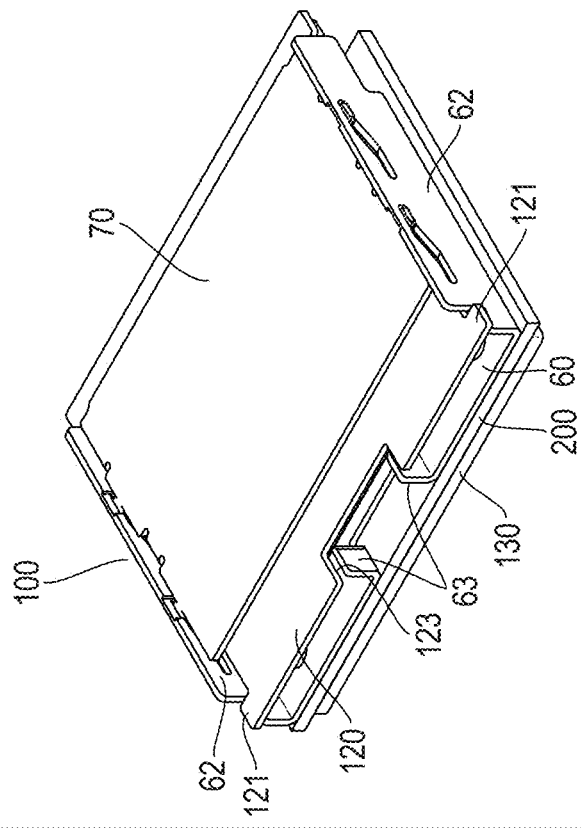
FIG. 4(d) is a perspective view of the state as viewed from a rearward side.
Figure 5:
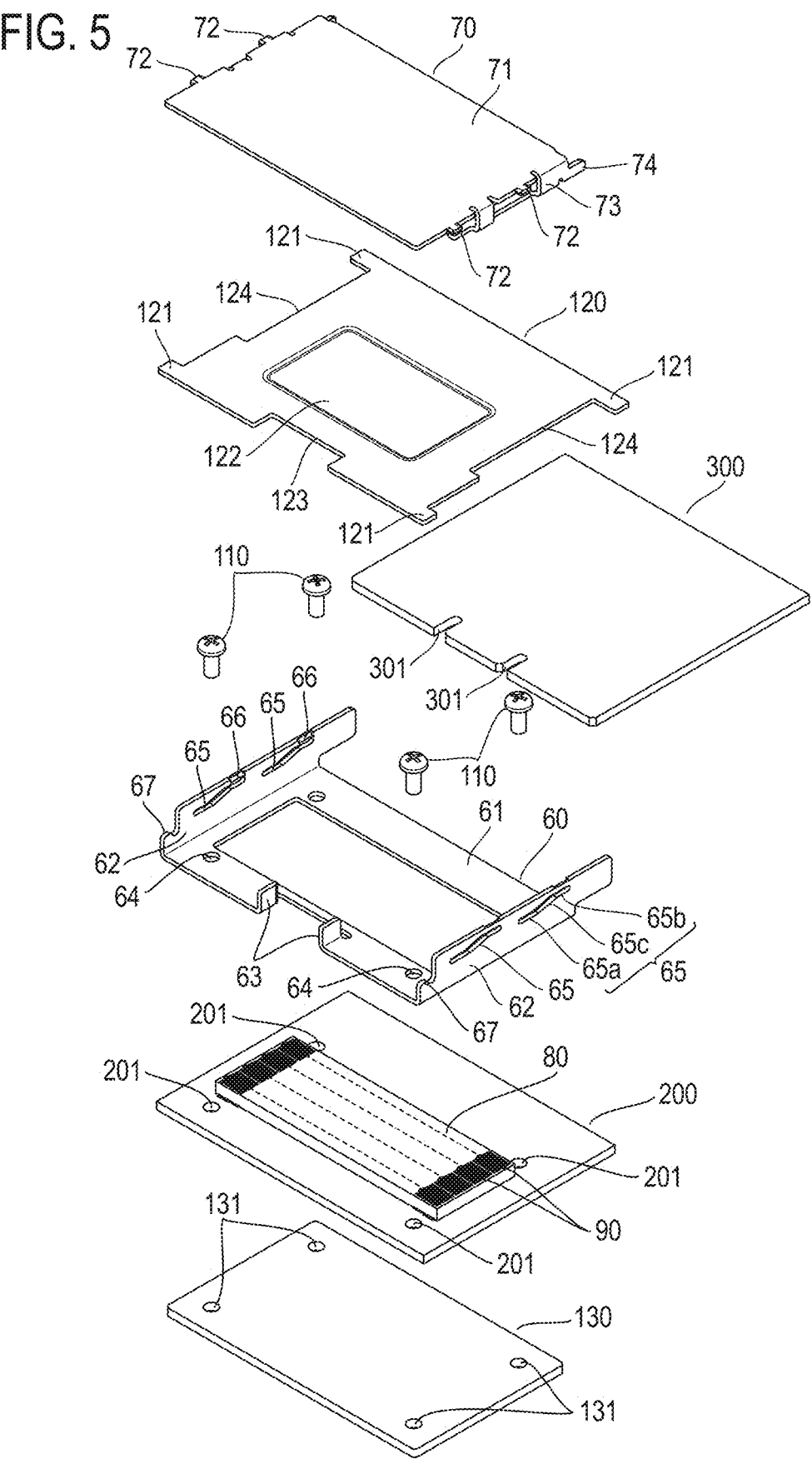
FIG. 5 is an exploded perspective view of the connector shown in FIG. 4, and shows also the main substrate and a module substrate.

The connector 100 is constituted by a frame 60, a slider 70, a housing 80, many contacts 90, four screws 110, a plate 120 and a rear plate 130. FIG. 5 shows parts into which the configuration shown in FIG. 4 is divided, and shows also a module substrate 300 that is electrically connected with the main substrate 200 by the connector 100. First, the configuration of each part will be described.

The frame 60 is made of a metal board, and includes a flat board part 61 that has a rectangular frame shape, and a pair of side board parts 62 that stand from both right-left-directional ends of the flat board part 61. A pair of protrusion pieces 63 that rise upward and face each other are formed at the center of a front end portion of the flat board part 61, and furthermore, four holes 64 are formed on the flat board part 61 as shown in FIG. 5.

On each of the pair of side board parts 62, two cam grooves 65 are formed so as to be arrayed in a front-rear direction. The cam groove 65 is formed as a hole that passes through the side board part 62, extends parallel to a board surface of the flat board part 61, and has a shape in which two elongate holes 65a, 65b positioned so as to deviate in a top-bottom direction are coupled to each other by an elongate hole 65c inclined with respect to the board surface of the flat board part 61. The elongate hole 65a on the front side of the cam groove 65 is positioned so as to be closer to the flat board part 61 than the elongate hole 65b on the rear side is. A concave part 66 that reaches the elongate hole 65b from an upper end of the side board part 62 is formed on each of mutually facing inner side surfaces of the pair of side board parts 62, and furthermore, a cutout 67 is formed at each of front ends of the pair of side board parts 62.

The slider 70 is made of a metal board, includes a rectangular board part 71, and has a tabular shape. Two projections 72 that protrude outward are formed at each of a pair of opposite side portions that are positioned at both right-left-directional ends of the board part 71, and furthermore, guide parts 73 are formed.

Figure 6A:
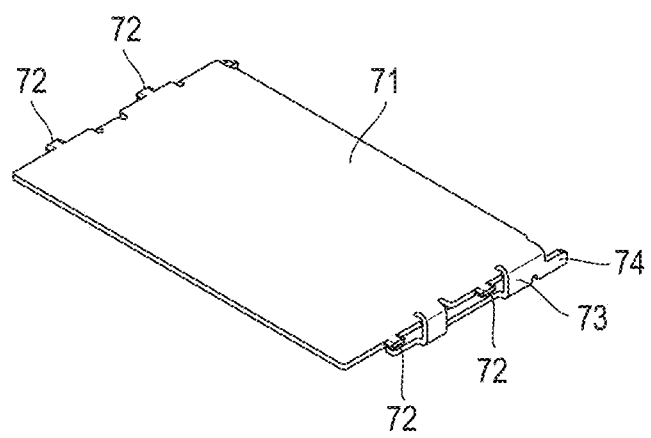
FIG. 6(a) is a perspective view of a slider in FIG. 4 as viewed from a forward side.
Figure 6B:
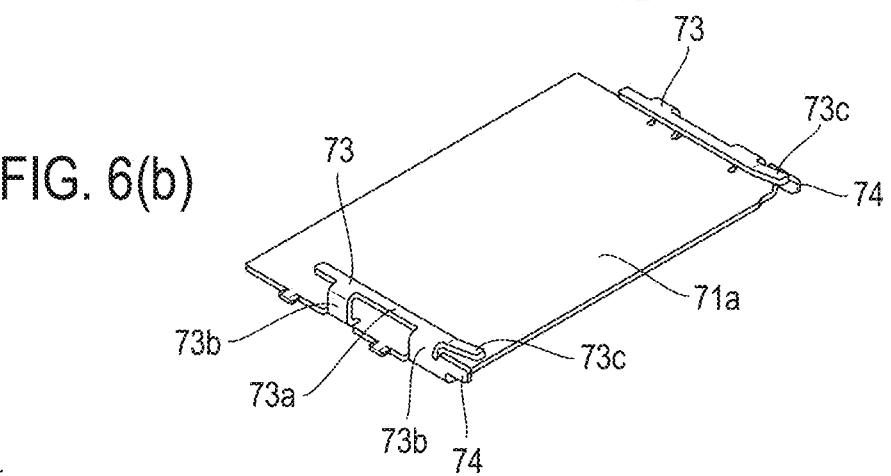
FIG. 6(b) is a perspective view of the slider in FIG. 4 as viewed from rearward side.

As shown in FIG. 6(b), the guide part 73 is constituted by an elongated support piece 73a that extends in the front-rear direction while facing a back surface 71a of the board part 71 and two extension pieces 73b that are folded so as to be extended from the board part 71 and that reach the support piece 73a. An introduction piece 73c that is extended in a direction of being away from the back surface 71a of the board part 71 is formed at a rear end of the support piece 73a.

Furthermore, on the slider 70, at each of rear ends of the pair of opposite side portions where the guide parts 73 are formed, a support part 74 is formed so as to protrude rearward, similarly to the introduction piece 73c. As shown in FIG. 6(b), the support part 74 is formed such that a board surface of the extension piece 73b that is of the two extension pieces 73b and that is positioned on the rear side is extended.

Figure 7:
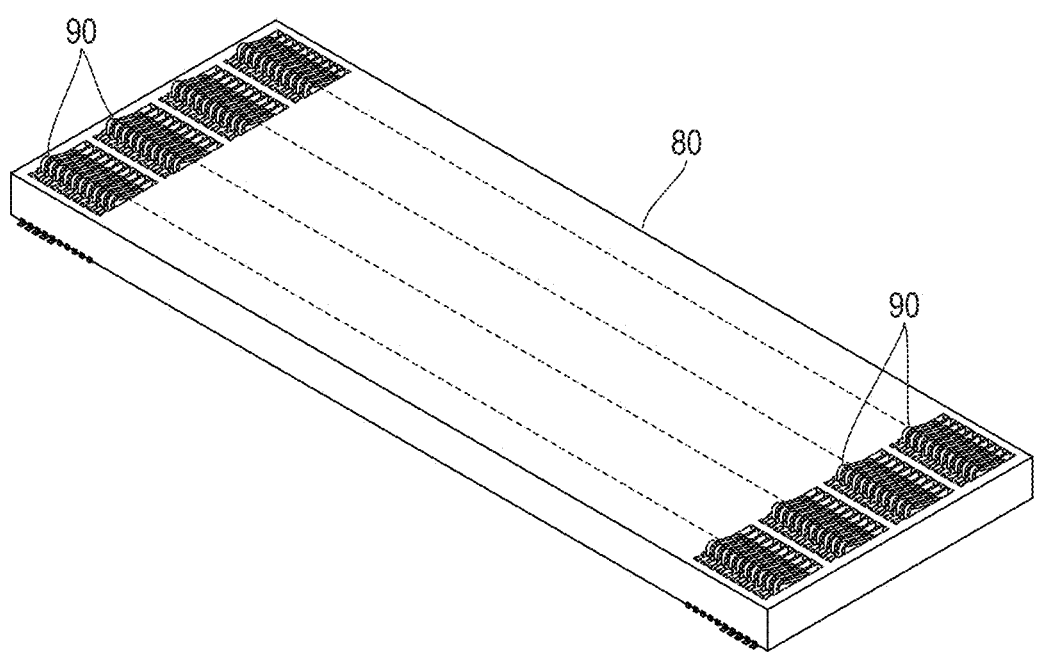
FIG. 7 is an enlarged perspective view of a housing holding contacts in FIG. 5.

The housing 80 is made of resin, and has a flattened shape. In the housing 80, the many contacts 90 are held so as to be arrayed lengthwise and breadthwise. In FIG. 5 and FIG. 7 in which FIG. 5 is enlarged, only contacts 90 positioned at both right-left-directional end portions of the housing 80 are illustrated, and contacts 90 positioned at a muddle portion are not illustrated. The contacts 90 are arrayed so as to correspond to many electrodes (which do not appear in FIG. 5) that are arrayed lengthwise and breadthwise on one surface of the module substrate 300.

The plate 120 has a roughly rectangular tabular shape, and is made of a metal board. At four corner parts, protrusion parts 121 are respectively formed so as to protrude, and at a central part, a step part 122 is formed on a lower surface side, so as to protrude in a rectangular island shape. Further, at a front end, an escape space 123 for the pair of protrusion pieces 63 of the frame 60 is formed so as to be cut out, and at both right and left ends, escape spaces 124 for the guide parts 73 of the slider 70 are formed so as to be cut out.

The rear plate 130 having a rectangular tabular shape is made of a metal plate, and includes a screw hole 131 at each of four corners.

On the main substrate 200 to which the connector 100 is attached, many electrodes to which the contacts 90 are connected are arrayed and formed, although the electrodes are hidden and do not appear in FIG. 5. On the main substrate 200, four holes 201 corresponding to the four holes 64 of the frame 60 are formed.

Next, the assembly of the connector 100 and the attachment to the main substrate 200 will be described.

First, the housing 80 holding the contacts 90 is mounted on the main substrate 200 by surface mount. The contacts 90 and the electrodes of the main substrate 200 are connected by soldering.

Next, the flat board part 61 of the frame 60 is mounted on the main substrate 200, the rear plate 130 is disposed on a back surface (lower surface) side of the main substrate 200, the four screws 110 are inserted into the holes 64 of the frame 60, the holes 201 of the main substrate 200 and the screw holes 131 of the rear plate 130, and the frame 60 and the rear plate 130 are fixed to the main substrate 200 by screwing. The main substrate 200 is sandwiched between the flat board part 61 of the frame 60 and the rear plate 130, and the housing 80 is positioned within the box of the flat board part 61 of the frame 60.

Next, the slider 70 is placed over the plate 120, the slider 70 and the plate 120 are assembled by putting the support parts 74 of the slider 70 under the two protrusion parts 121 positioned rearward on the plate 120 respectively, and in this state, the slider 70 is attached to the frame 60. The attachment is performed by inserting the two projections 72 formed at the pair of opposite side portions of the slider 70 into the cam grooves 65 formed on the pair of side board parts 62 of the frame 60 from the concave parts 66 respectively.

Accordingly, the assembly of the connector 100 and the attachment to the main substrate 200 are completed, and the configuration shown in FIG. 4 is obtained. The plate 120 is positioned between the pair of side board parts 62, such that the two protrusion parts 121 positioned forward are respectively positioned on the cutouts 67 at the front ends of the pair of side board parts 62 and the two protrusion parts 121 positioned rearward are respectively positioned on the support parts 74 of the slider 70.

The positioning of the plate 120 in the right-left direction is performed while the plate 120 is sandwiched between the pair of side board parts 62, and the positioning of the plate 120 on the frame 60 in the front-rear direction is performed while the two protrusion parts 121 in the front-rear direction sandwich the side board part 62 as shown in FIG. 4. The positioning in the right-left direction and the front-rear direction is performed with some backlash.

FIG. 8 shows a state where the module substrate 300 is inserted into the above-described connector 100 and where the module substrate 300 and the main substrate 200 are electrically connected, and the operation of the insertion and connection of the module substrate 300 in the connector 100 will be described below.

Figure 9A:
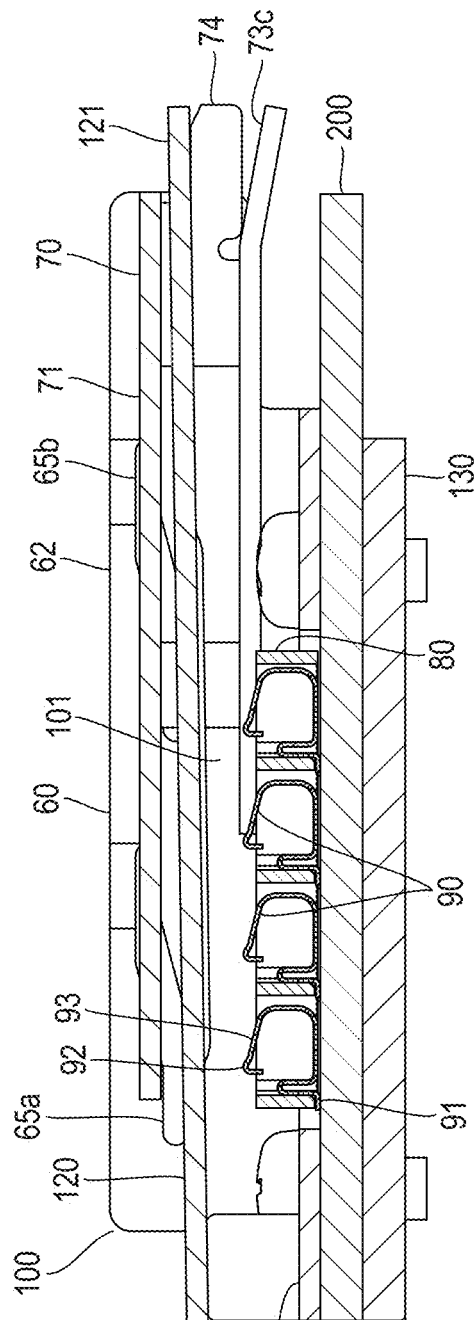
FIG. 9(a) is an E-E line enlarged sectional view of FIG. 4(a)

FIG. 9(a) shows a section (a section in the state shown in FIG. 4) before the insertion of the module substrate 300, and the slider 70, while the projections 72 inserted into the cam grooves 65 of the frame 60 are positioned on the rear end sides of the cam grooves 65, that is, in the elongate holes 65b. The board part 71 of the slider 70 is parallel to the housing 80 and the main substrate 200. As shown in FIG. 9(a), the plate 120 is in an inclined state (oblique state), and an insertion space 101 for the module substrate 300 is formed between the plate 120 and the housing 80.

One end of the contact 90 held by the housing 80 is a connection part 91 that is connected to the electrode (not illustrated) of the main substrate 200, and the connection part 91 is connected to the electrode of the main substrate 200 by soldering. The other end of the contact 90 is a contact part 92 that comes into contact with the electrode of the module substrate 300 to be inserted into insertion space 101, and protrudes from the upper surface (the opposing surface of the main substrate mount surface) of the housing 80. In this example, the contact 90 includes a spring part 93 that is bent in a U-shape, and the contact part 92 is a free end side of the spring part 93. The contact part 92 extends in the insertion direction of the module substrate 300.

The module substrate 300 is inserted between the board part 71 of the slider 70 and the guide part 73. As for the module substrate 300, both width-directional (right-left-directional) side edge parts of one surface (lower surface) on which the electrodes are arrayed are supported by the guide parts 73 respectively, and the insertion into the insertion space 101 is guided. The module substrate 300 is supported and guided by the guide parts 73 in this way, and thereby is inserted without making contact with the contacts 90.

The two protrusion pieces 63 provided at the front end of the flat board part 61 of the frame 60 are fit into the two cutouts 301 formed at the insertion-directional front end, and thereby the right-left-directional (width-directional) positioning of the module substrate 300 inserted into the insertion space 101 is performed. The module substrate 300 inserted into the insertion space 101 abuts against the two protrusion pieces 63, and thereby further insertion is restricted.

Figure 9B:
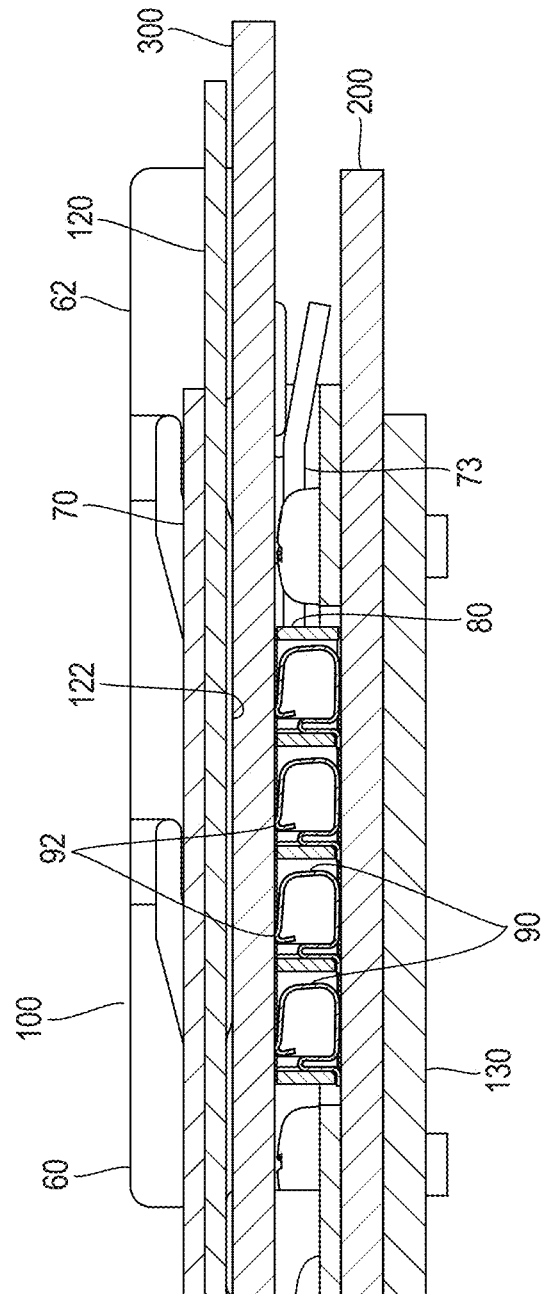
FIG. 9(b) is an E-E line enlarged sectional view of FIG. 8(a)

After the insertion of the module substrate 300, the slider 70 is slid in the same direction as the insertion direction of the module substrate 300. The projections 72 of the slider 70 move along the cam grooves 65 of the frame 60, and reach the front end sides of the cam grooves 65, that is, the elongate holes 65a. The slider 70 shifts in a direction of getting close to the housing 80, and presses the module substrate 300 inserted into the insertion space 101 against the contact parts 92 of the contacts 90 through the plate 120. Accordingly, the electrodes of the module substrate 300 and the contacts 90 come into contact with each other, and are electrically connected. FIG. 9(b) shows this state.

The first embodiment of the connector according to the mode for carrying out the invention has been described above. According to the above-described connector 100, it is possible to obtain the following effects.

(1) Unlike the conventional example, the slider 70 does not include the abutment part against which the inserted module substrate 300 abuts, that is, the module substrate 300 does not slide integrally with the slider 70, and after the module substrate 300 is inserted to the predetermined position, it is possible to press the module substrate 300 against the contact parts 92 of the contacts 90, by sliding the slider 70. Consequently, unlike the conventional example, the insertion of the module substrate 300 does not cause the sliding between the module substrate 300 and the contacts 90. Accordingly, it is possible to prevent the wear of the contacts 90 and the electrodes of the module substrate 300, compared to the conventional example, and it is possible to restrain the increase in contact resistance due to the wear. Accordingly, it is possible to increase the life of the connector, compared to the conventional example.

(2) The withdrawal of the module substrate 300 from the connector 100 is performed by sliding the slider 70 in the opposing direction of the direction at the time of the insertion and moving the module substrate 300 in a direction of getting away from the contacts 90. Since the plate 120 is interposed between the slider 70 and the module substrate 300, it is unlikely that the module substrate 300 moves together due to the sliding of the slider 70, and thereby it is possible to prevent the wear of the contacts 90 and the electrodes of the module substrate 300, also at the time of the withdrawal of the module substrate 300.

(3) The step part 122 provided on the plate 120 so as to protrude in a rectangular island shape limits the range of the contact between the plate 120 pressed by the slider 70 and the module substrate 300, and concentrates the pressing force to the module substrate 300. This prevents the warp of the module substrate 300 in the state where the connection of the module substrate 300 is completed, and gives a suitable contact force between the electrodes of the module substrate 300 and the contacts 90.

Second Embodiment

Figure 11:
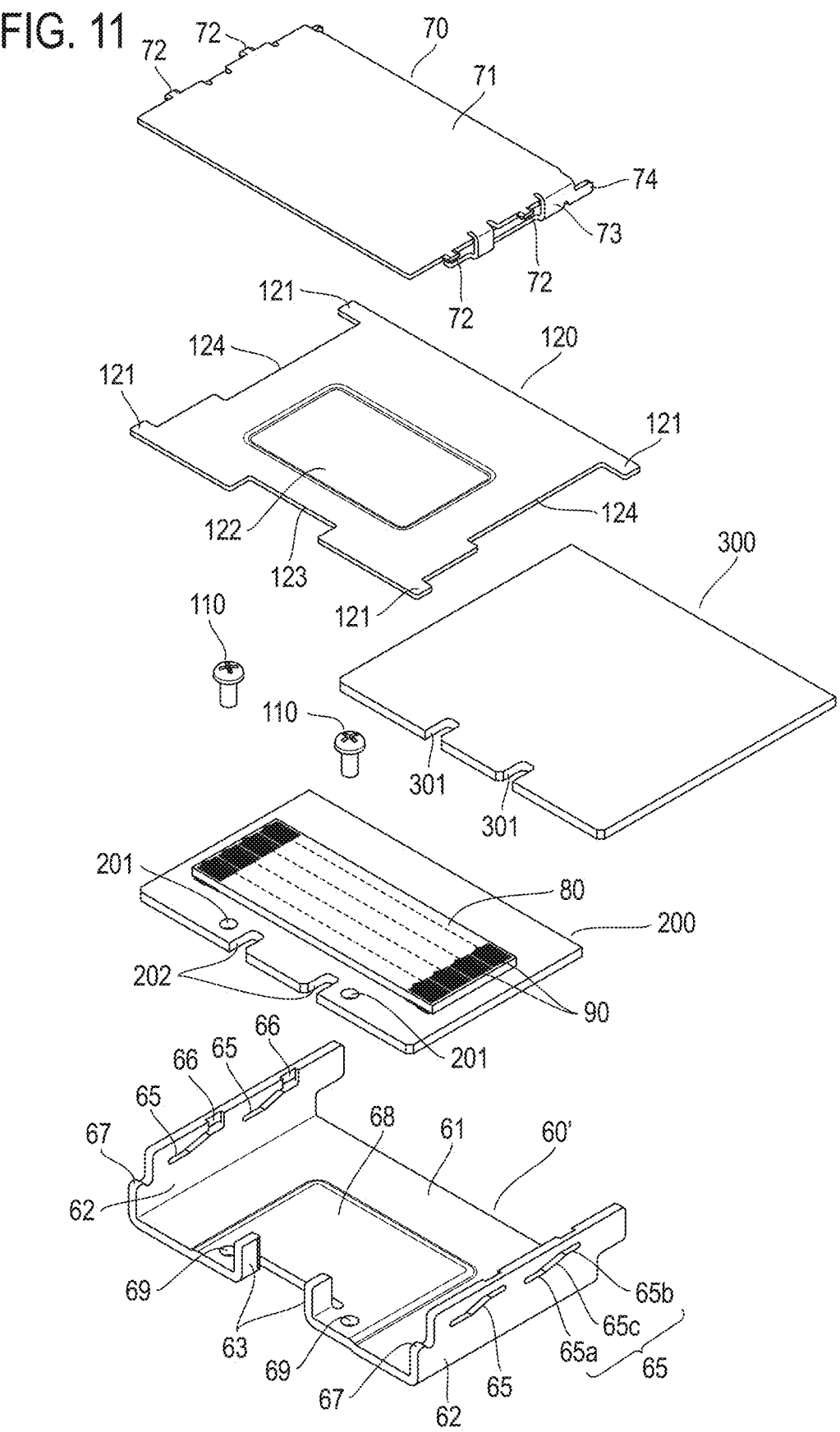
FIG. 11 is an exploded perspective view of the connector shown in FIG. 10, and shows also the main substrate and the module substrate.

FIG. 10 shows the external appearance of a second embodiment of the connector according to the mode for carrying out the invention, similarly to FIG. 4, and FIG. 11 shows parts into which the configuration shown in FIG. 10 is divided, similarly to FIG. 5. Portions corresponding to those in the first embodiment are denoted by identical reference characters, and detailed descriptions thereof are omitted.

A connector 100' in the second embodiment is different in the arrangement of a frame 60' from the connector 100 in the first embodiment. A flat board part 61 of the frame 60' shown in FIG. 10 is positioned on an opposing surface of the surface of the main substrate 200 where the housing 80 is mounted, and a pair of side board parts 62 are positioned so as to sandwich the portion of the main substrate 200 where the housing 80 is mounted.

The flat board part 61 of the frame 60' has not a frame shape but a tabular shape, and in this embodiment, a step part 68 is formed on an upper surface side of the flat board part 61, so as to protrude in a rectangular island shape. The flat board part 61 of the frame 60' is positioned on the back surface (lower surface) side of the main substrate 200 in this way, and thereby, there is no rear plate 130 in this embodiment.

The main substrate 200 is mounted on the flat board part 61 of the frame 60', and two screws 110 are screwed into two screw holes 69 formed on the flat board part 61, through two holes 201 on the main substrate 200, so that the main substrate 200 is fixed to the flat board part 61 by screwing. Two cutouts 202 are formed at a front end of the main substrate 200, and the positioning of the main substrate 200 on the frame 60' is performed by fitting a pair of protrusion pieces 63 of the frame 60' into the cutouts 202.

FIG. 12 shows a connection completion state where the module substrate 300 is inserted into the connector 100' and where the module substrate 300 and the main substrate 200 are electrically connected, FIG. 13(a) shows a sectional surface (a sectional surface in the state shown in FIG. 10) before the insertion of the module substrate 300, and FIG. 13(b) shows a sectional surface in the connection completion state.

The operation of the insertion and connection of the module substrate 300 in the connector 100' is the same as the above-described operation in the connector 100 in the first embodiment.

The step part 68 provided on the flat board part 61 of the frame 60' corresponds to the step part 122 on the plate 120, and limits the contact range of the flat board part 61 to the portion of the main substrate 200 where the housing 80 is mounted. The main substrate 200, the housing 80 and the module substrate 300 are sandwiched between the step parts 68 and 122. Accordingly, it is possible to obtain a suitable contact force between the electrodes of the module substrate 300 and the contacts 90, and to suitably prevent the deflection of the main substrate 200 and the module substrate 300.

The embodiments of the mode for carrying out the invention have been described above. The cam groove and the projection that constitute the cam mechanism are not limited to the configuration in the first and second embodiments. The cam groove may be provided on the slider, and the projection may be provided on the frame.

What is claimed is:

1. A connector for electrically connecting a module substrate and a main substrate, the module substrate comprising a plurality of electrodes arrayed lengthwise and breadthwise on one surface of the module substrate, the connector comprising:

a flattened housing being mounted on the main substrate;

a plurality of contacts being arrayed and held on the flattened housing so as to correspond to the electrodes of the module substrate, the contacts comprising contact parts protruding from an opposing surface of a main substrate mount surface of the flattened housing and connection parts being connected to the electrodes of the main substrate;

a frame comprising a flat board part fixed to a board surface of the main substrate, the pair of side board parts standing from the flat board part, one of a cam groove and a projection constituting a cam mechanism being formed on the pair of side board parts;

a slider comprising a tabular shape, the other of the cam groove and the projection constituting the cam mechanism being formed at a pair of opposite side portions of the slider, the slider being attached between the pair of side board parts while the projection is inserted into the cam groove; and a plate comprising a tabular shape, the plate including protrusion parts at four corner parts, the two protrusion parts positioned forward being positioned on cutouts formed at front ends of the pair of side board parts, the two protrusion parts positioned rearward being positioned on support parts formed so as to protrude rearward at rear ends of the pair of opposite side portions of the slider and being contained between the pair of side board parts, the plate forming an insertion space for the module substrate between the plate and the flattened housing mounted on the main substrate, wherein the slider has a structure in which when the slider slides in the same direction as a direction of insertion of the module substrate into the insertion space, the slider shifts by the cam mechanism and presses the module substrate against the contact parts through the plate.

2. The connector according to claim 1, wherein:

guide parts are provided at the pair of opposite side portions of the slider, the guide parts being capable of supporting both width-directional side edge parts of the one surface of the module substrate that is inserted into the insertion space and guiding the insertion of the module substrate into the insertion space; and escape spaces for the guide parts are provided on the plate.

3. The connector according to claim 1, wherein:

the module substrate includes a cutout at an insertion-directional front end; and a protrusion piece that is fit into the cutout and by which a positioning of the module substrate is performed is formed on the flat board part.

4. The connector according to claim 2, wherein:

the module substrate comprises a cutout at an insertion-directional front end; and a protrusion piece that is fit into the cutout and by which a positioning of the module substrate is performed is formed on the flat board part.

5. The connector according to claim 1, wherein:

the flat board part is positioned on an opposing surface of a housing mount surface of the main substrate; and the pair of side board parts stand so as to sandwich a portion of the main substrate where the flattened housing is mounted.

6. The connector according to claim 2, wherein:

the flat board part is positioned on an opposing surface of a housing mount surface of the main substrate; and the pair of side board parts stand so as to sandwich a portion of the main substrate where the flattened housing is mounted.

* * * * *